United States Patent
Payne et al.

(10) Patent No.: US 10,746,983 B2
(45) Date of Patent: Aug. 18, 2020

(54) SPATIAL LIGHT MODULATORS FOR PHASED-ARRAY APPLICATIONS

(71) Applicant: SILICON LIGHT MACHINES CORPORATION, Sunnyvale, CA (US)

(72) Inventors: Alexander Payne, Ben Lomond, CA (US); James Hunter, Campbell, CA (US); Lars Eng, Los Altos, CA (US)

(73) Assignee: Silicon Light Machines Corporation, Sunnyvale, CA (US)

( * ) Notice: Subject to any disclaimer, the term of this patent is extended or adjusted under 35 U.S.C. 154(b) by 250 days.

(21) Appl. No.: 16/008,772

(22) Filed: Jun. 14, 2018

(65) Prior Publication Data
US 2018/0299664 A1 Oct. 18, 2018

Related U.S. Application Data

(60) Provisional application No. 62/551,703, filed on Aug. 29, 2017.

(51) Int. Cl.
*G02B 26/08* (2006.01)
*G01S 7/481* (2006.01)
*G02B 27/00* (2006.01)

(52) U.S. Cl.
CPC ........ *G02B 26/0841* (2013.01); *G01S 7/4817* (2013.01); *G02B 27/0087* (2013.01)

(58) Field of Classification Search
CPC ............ G02B 26/0841; G02B 27/0087; G01S 7/4817
See application file for complete search history.

(56) References Cited

U.S. PATENT DOCUMENTS

| 5,459,610 | A | 10/1995 | Bloom et al. |
| 6,144,481 | A | 11/2000 | Kowarz et al. |
| 9,217,856 | B1 * | 12/2015 | Wang ................ G02B 26/00 |
| 2003/0095318 | A1 | 5/2003 | DiCarlo et al. |

OTHER PUBLICATIONS

International Search Report for International Application PCT PCT/US18/48032 dated Nov. 1, 2018.
Written Opinion of International Searching Authority Application PCT PCT/US18/48032 dated Nov. 1, 2018.

* cited by examiner

*Primary Examiner* — Wen Huang
(74) *Attorney, Agent, or Firm* — William Nuttle (57) ABSTRACT

A capacitive micro-electromechanical system (MEMS) structure or device and methods of making and operating the same are described. Generally, the MEMS device provides a large stroke while maintaining good damping, enabling fast beam steering and large scan angles. In one embodiment, the capacitive MEMS device includes a bottom electrode formed over a substrate; an electrically permeable damping structure formed over the bottom electrode, the electrically permeable damping structure including a first air-gap and a dielectric layer suspended above and separated from the bottom electrode by the first air-gap; and a plurality of movable members suspended above the damping structure and separated therefrom by a second air-gap, each of the plurality of movable members including a top electrode and being configured to deflect towards the bottom electrode by electrostatic force. Other embodiments are also described.

8 Claims, 11 Drawing Sheets

SPATIAL LIGHT MODULATORS FOR PHASED-ARRAY APPLICATIONS

CROSS-REFERENCE TO RELATED APPLICATIONS

This application claims the benefit of priority under 35 U.S.C. 119(e) to U.S. Provisional Patent Application Ser. No. 62/551,703 filed Aug. 29, 2017, which is incorporated by reference herein in its entirety.

TECHNICAL FIELD

The present invention relates generally to spatial light modulators (SLMs), and more particularly to SLMs and methods for operating the same in phased-array applications.

BACKGROUND

Optical phased-array are widely used in a number of different applications including Light Detection and Ranging (LIDAR) systems in which beams of electromagnetic radiation or light are steered and light reflected from objects scanned to detect and determine the range of objects detected by the LIDAR system. Typically, optical phased-arrays used in LIDAR systems require fast beam steering and large scan angles.

One type of spatial light modulators (SLM) used in optical phased-arrays in LIDAR systems is a mechanical SLM, such as a laser scanner that includes a spinning or moving mirror to steer the light beam. Unfortunately, these mechanical SLMs are rather bulky and the relatively large mass of the mirror limits the speed with which the light beams can be steered or scanned.

Another type of SLM suitable for use in optical phased-arrays is a digital micromirror device (DMD) based SLM in which several hundred if not thousands of microscopic mirrors arranged in an array are electrostatically pivoted or tilted in response to electronic signals. Although capable of providing much faster beam steering than the mechanical SLM, achieving large scan angles requires small DMD dimensions, approaching the wavelength of the radiation being scanned. This in turn makes it difficult to maintain the speed advantage of the DMD-based LIDAR system.

Accordingly, there is a need for a SLMs and a method for operating the same to provide fast beam steering and large scan angles for phased-array applications.

SUMMARY

In a first aspect a capacitive microelectromechanical system (MEMS) device, such as a ribbon-type spatial light modulator is provided having a large stroke while maintaining good damping, thereby enabling fast beam steering and large scan angles. In one embodiment, the MEMS device includes a bottom electrode formed over a substrate; an electrically permeable damping structure formed over the bottom electrode, the electrically permeable damping structure including a first air-gap and a dielectric layer suspended above and separated from the bottom electrode by the first air-gap; and a plurality of movable members suspended above the damping structure and separated therefrom by a second air-gap, each of the plurality of movable members including a top electrode and being configured to deflect towards the bottom electrode by electrostatic force.

In another aspect, an efficient method for driving the capacitive MEMS device is provided. Generally, the method involves ganging together a large group of MEMS pixels, each comprising a plurality of electrostatically deflectable narrow ribbons, and driving each group of MEMS pixels with a repetitive pattern to steer a beam of light reflected from the ribbons.

BRIEF DESCRIPTION OF THE DRAWINGS

Embodiments of the present invention will be understood more fully from the detailed description that follows and from the accompanying drawings and the appended claims provided below, where:

DETAILED DESCRIPTION

Embodiments of microelectromechanical system (MEMS) based spatial light modulators (SLMs), and methods for operating the same for use in phased-array applications, such as Light Detection and Ranging (LIDAR) systems, is disclosed. In the following description, numerous specific details are set forth, such as specific materials, dimensions and processes parameters etc. to provide a thorough understanding of the present invention. However, particular embodiments may be practiced without one or more of these specific details, or in combination with other known methods, materials, and apparatuses. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

One type of MEMS based SLM suitable for use in a phased array of a LIDAR system to modulate or steer a beam of light is a ribbon-type SLM, such as a Grating Light Valve (GLV™), commercially available from Silicon Light Machines, in Sunnyvale Calif.

An embodiment of a ribbon-type SLM will now be described with reference to FIGS. 1A and 1B. For purposes of clarity, many of the details of MEMS in general and MEMS optical modulators in particular that are widely known and are not relevant to the present invention have been omitted from the following description. The drawings described are only schematic and are non-limiting. In the drawings, the size of some of the elements may be exaggerated and not drawn to scale for illustrative purposes. The dimensions and the relative dimensions may not correspond to actual reductions to practice of the invention.

Figure 1A:
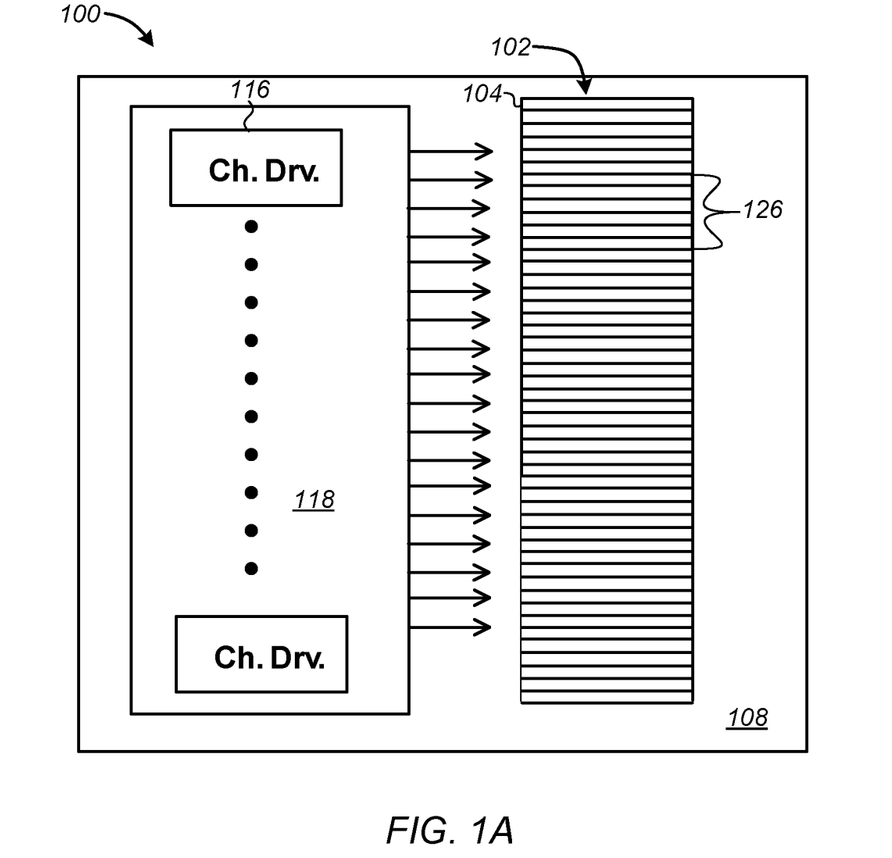
FIGS. 1A and 1B illustrate schematic block diagrams of an embodiment of a ribbon-type SLM.
Figure 1B:
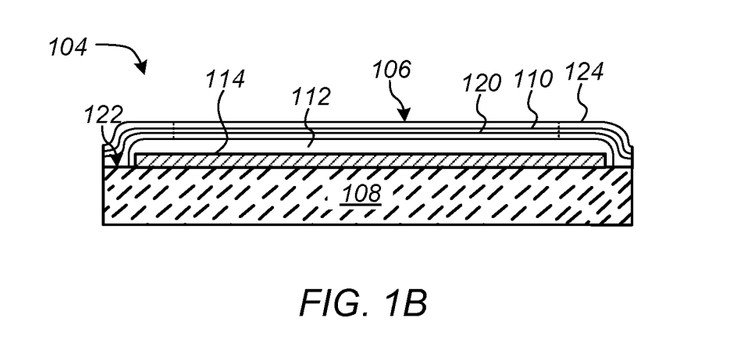

Referring to FIGS. 1A and 1B in the embodiment shown the SLM 100 includes a linear array 102 composed of thousands of free-standing, addressable electrostatically actuated ribbons 104, each having a light reflective surface 106 supported over a surface of a substrate 108. Each of the ribbons 104 includes an electrode 110 and is deflectable through a gap or cavity 112 toward the substrate 108 by electrostatic forces generated when a voltage is applied between the electrode in the ribbon and a base electrode 114 formed in or on the substrate. The ribbon electrodes 110 are driven by a drive channel 116 in a driver 118, which may be integrally formed on the same substrate 108 with the array 102.

A schematic sectional side view of a movable structure or ribbon 104 of the SLM 100 of FIG. 1A is shown in FIG. 1B. Referring to FIG. 1B, the ribbon 104 includes an elastic mechanical layer 120 to support the ribbon above a surface 122 of the substrate 108, a conducting layer or electrode 110 and a reflective layer 124 including the reflective surface 106 overlying the mechanical layer and conducting layer.

Generally, the mechanical layer 120 comprises a taut silicon-nitride film (SiNx), and is flexibly supported above the surface 122 of the substrate 108 by a number of posts or structures, typically also made of SiNx, at both ends of the ribbon 104. The conducting layer or electrode 110 can be formed over and in direct physical contact with the mechanical layer 120, as shown, or underneath the mechanical layer. The conducting layer or ribbon electrode 110 can include any suitable conducting or semiconducting material compatible with standard MEMS fabrication technologies. For example, the conducting layer 110 can include a doped polycrystalline silicon (poly) layer, or a metal layer. Alternatively, if the reflective layer 124 is metallic it may also serve as the electrode 110.

The separate, discrete reflecting layer 124, where included, can include any suitable metallic, dielectric or semiconducting material compatible with standard MEMS fabrication technologies, and capable of being patterned using standard lithographic techniques to form the reflective surface 106.

In the embodiment shown, a number of ribbons are grouped together to form a large number of MEMS pixels 126, each driven by a much smaller number of drive channels 116.

Figure 2:
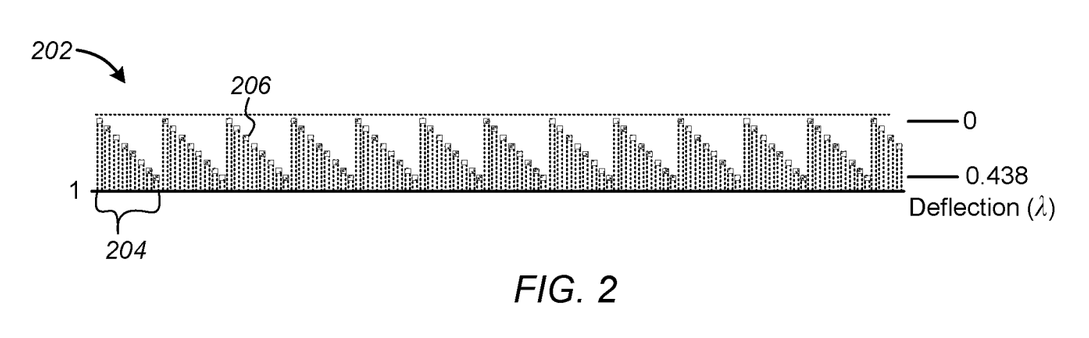
FIG. 2 is a schematic representation pitch and amplitude of deflection of ribbons in a ribbon-type SLM to steer light reflecting from a surface of the ribbon-type SLM.

FIG. 2 is a schematic representation of a portion of an array 202 in a ribbon-type SLM shown in cross-section to long axes of the ribbons, and showing a variation in pitch and amplitude of deflection of the ribbons to steer light reflecting from a surface of the ribbon-type SLM. Referring to FIG. 2 it has been found that by ganging together a large group of MEMS pixels 204, each including multiple ribbons 206, and driving each ribbon in a MEMS pixel to monotonically vary deflection of each ribbon from one end of the pixel to the next, it is possible to produce a repetitive pattern across an array of pixel that can be used to steer a beam of light. By monotonically varying deflection it is meant that a first ribbon as one end of the pixel is deflected by a first amount, while a second ribbon adjacent to the first is varied by a second amount greater than the first amount, and a third ribbon adjacent to the second ribbon on a side opposite the first ribbon is deflected by a third amount greater than the second amount, and so on across the entire pixel. Furthermore, by using a SLM having a programmable MEMS pixel 204 pitch or spacing, by changing the number of ribbons 206 within a pixel it is possible to form and to continuously alter an angle of light reflected from the SLM, such as is particularly useful in steering a beam of light in phased-array applications, such as LIDAR.

Figure 3:
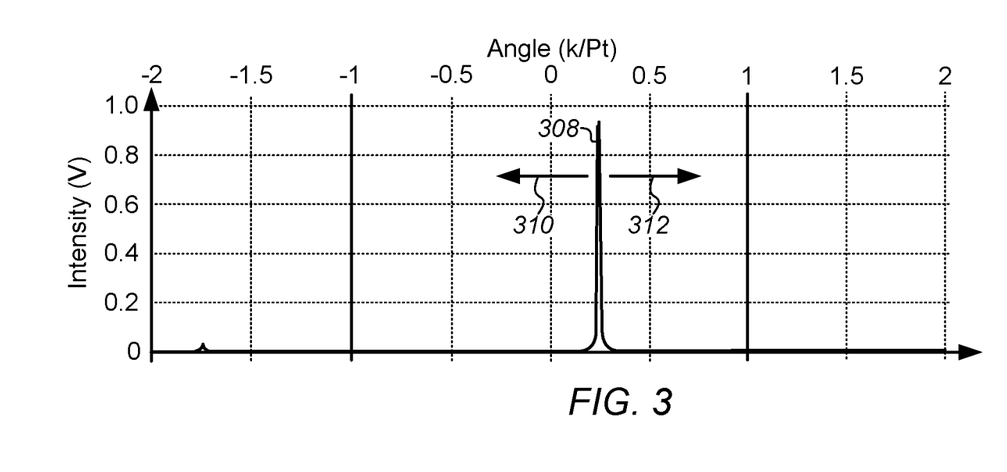
FIG. 3 is a graph of intensity versus steering angle and illustrates the suitability of the ribbon-type SLM represented in FIG. 2 for phased array applications.

FIG. 3 is a graph of intensity versus steering angle and illustrates the suitability of the ribbon-type SLM represented schematically in FIG. 2 for phased array applications. Referring to FIG. 3, it is seen that the periodic spatial pattern along ribbon-type SLM shown in FIG. 2 creates a phased-array reflection, while varying the spatial period and amplitude of the pattern changes the reflected beam angle, allowing the ribbon-type SLM to rapidly cycle through patterns to sweep beam across field. In particular, it is noted that as the period of the spatial pattern on the array 204 increases, i.e., as each period includes a greater number of ribbons, a maximum intensity 308 with which light is reflected from the array 202 shifts to the left as indicated by arrow 310. As spatial period decreases or the number of ribbons in each period reduced, the maximum intensity 308 with which light is reflected from the array 202 shifts to the right as indicated by arrow 312.

The high switching speed of the ribbon-type SLM makes it attractive for phased-array applications such as LIDAR. However, designing ribbon-type SLM for LIDAR presents two challenges. First, a large stroke, i.e., an amount by which an individual ribbon can be deflected, is generally required. Often it is desirable that the ribbon-type SLM have a stroke up to or exceeding the wavelength of the light being modulated or steered. For example, it has been found a stroke of greater than 1 µm is desirable to achieve adequate phase shift in applications for LIDAR using 1550 nm wavelengths. Thus, it is desirable that a ribbon-type SLM designed for LIDAR include an air gap under the ribbons that can accommodate strokes of up to 2 μm.

A second challenge for ribbon-type SLMs used for phased-array applications, such as LIDAR, is that the ribbons should include narrow ribbon widths to achieve wide angular swing. Generally, it is desirable that a ribbon used in ribbon-type SLMs for phased-array applications have a ribbon width of about 2.5 μm or less, and in some embodiments can be as narrow as 0.5 μm.

These requirements of a large stroke and a narrow ribbon width make it very difficult to switch the ribbon-type SLM at a high rate of speed, which is desirable for beam steering, because narrow ribbons over large air gaps are very poorly damped and can behave like a guitar string, taking a long time to settle and thereby limiting the rate of speed at which the beam can be steered.

Figure 4:
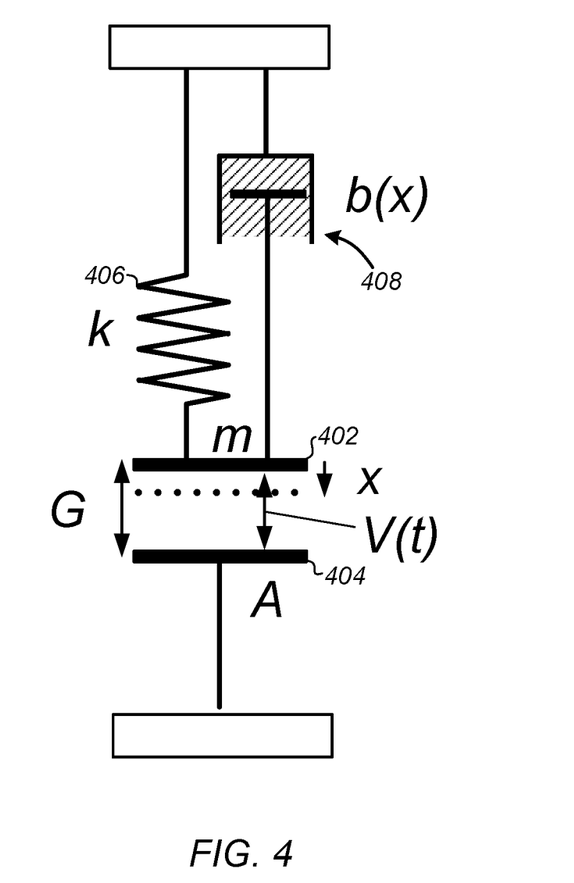
FIG. 4 is a schematic diagram modeling a ribbon of ribbon-type SLM as a capacitor-on-a-spring.

The impact of air gap and ribbon width on settling time will now be described with reference to FIG. 4. FIG. 4 is a schematic diagram modeling a ribbon of ribbon-type SLM as a capacitor-on-a-spring. Referring to FIG. 4, a voltage potential V(t) applied between a ribbon 402 and a grounded lower or substrate electrode 404 creates an electrostatic Coulomb attraction that deflects the ribbon a distance x towards the substrate electrode. The electrostatic force is balanced by an elastic restoring force (represented by a spring 406 in FIG. 4). The elastic restoring force, which is due to the taut silicon-nitride film the mechanical layer (shown as mechanical layer 120 in FIG. 1B), allows the ribbon 402 to revert back to a neutral state or position once the electrostatic force is removed. In addition there is a damping force (represented by a damper 408 in FIG. 4), arising from squeeze-film damping which slows or damps movement of the ribbon 402 by the Coulomb force and the elastic restoring force. Squeeze-film damping is a strong function of both ribbon width and air-gap thickness. Settling time is proportional to the cube of the air-gap thickness, and inversely proportional to the cube of the ribbon width. Thus, to achieve adequate damping with narrow ribbons, it is desirable to have a very thin air-gap.

The Coulomb attraction force ($F_{Coulomb}$) is given by:

$$F_{Coulomb} = \frac{1}{2} \frac{\varepsilon_0 A V^2}{(G-x)^2}$$

where $\varepsilon_0$ is the permittivity of free space, A is the effective capacitive area of the ribbon in square meters (m$^2$), G is gap thickness, and x is the linear displacement of the ribbon in meters, relative to the substrate electrode.

The Elastic Restoring Force ($F_{Elastic}$) is given by:

$$F_{Elastic} = -kx$$

where k is the spring constant of the mechanical layer, and x is the linear displacement of the ribbon 402, in meters, relative to the substrate electrode 404.

The Damping force ($F_{Damping}$) is given by:

$$F_{Damping} = -b\frac{dx}{dt}$$

where b is the damping constant of the air gap, and x is the linear displacement of the ribbon 402, in meters, relative to the substrate electrode 404.

Thus, at equilibrium these three forces, Coulomb attraction, Elastic restoring force and the Damping force, must balance.

However, as the ribbon 402 displaces past ⅓ a total thickness of the gap (G) between the ribbon in the neutral state and substrate electrode 404, the electrostatic force can overwhelm the elastic restoring force. This results in a potentially destructive phenomenon commonly referred to as "snap-down" or "pull-in," in which the ribbon 402 snaps into contact with the substrate electrode 404 and sticks there even when the electrostatic force is removed. Generally, it has been observed that snap-down occurs at a characteristic displacement of x=G/3, where the ribbon 402 has been deflected by one third of the original gap thickness. Thus, the ribbons in conventional ribbon-type SLM are typically operated or driven to not be deflected by a distance more than G/3 to prevent snap-down. Unfortunately, this leaves the lower ⅔ of the gap G empty, which in turn leads to poor squeeze-film damping.

Thus, to achieve adequate damping with narrow ribbons, it is desirable to create a very thin squeeze film gap, approaching the physical stroke (x) desired for the application, while to avoid pull-in it is desirable to create a much larger "electrical gap."

Reducing the squeeze film gap while maintaining or increasing the electrical gap can be done by inserting a dielectric between the ribbon and the substrate electrode. In one embodiment, a solid dielectric film underneath the ribbon is used to improve damping (and heat transfer) in this way. For a dielectric thickness of G, the equivalent electrical thickness is G/$\varepsilon_r$, where εr is the relative dielectric constant. For example, for silicon dioxide solid dielectric film having a relative dielectric constant of $\varepsilon_r$=3.9, and a vacuum or air gap having a relative dielectric constant of $\varepsilon_r$=1, to increase the electrical gap by 1 μm, it is necessary to provide nearly an additional 4 μm of a dielectric material over the substrate electrode between the ribbon and substrate electrode. It is noted that integrating thick films, i.e., films having a thickness greater than about 2 μm, into an existing MEMS process used to fabricate ribbon-type SLMs can be difficult or impractical, since intrinsic film stresses can cause such thick films to void or delaminate, and film roughness can become excessive with increased thickness. For this reason, a low dielectric constant material is preferred.

In another embodiment, the squeeze film gap is reduced while maintaining or increasing the electrical gap by use of an electrically permeable damping structure formed over the substrate electrode during fabrication. Generally, the electrically permeable damping structure includes a dielectric layer suspended above and separated from the substrate electrode by a first gap or first air-gap, where the dielectric layer defines at least a top surface of the air-gap. It is noted that although this first gap is referred to as an air-gap throughout the remainder of this disclosure, it need not be filled with air, but can alternatively be evacuated or filled with a mixture of other gases without departing from the scope of the present invention. In some embodiments, the dielectric layer can substantially surround the air-gap to form a hermetic or hermetically sealed cavity. In other embodiments, the first air gap is open to the MEMs environment, including a second gap or air-gap between the electrically permeable damping structure and a lower surface of the ribbons, and the entire environment of the ribbon-type SLM can be evacuated or filled with fill gases and hermetically sealed. Suitable fill gases can include pure form or mixtures of one or more of Nitrogen, Hydrogen, Helium, Argon, Krypton or Xenon.

Figure 5:
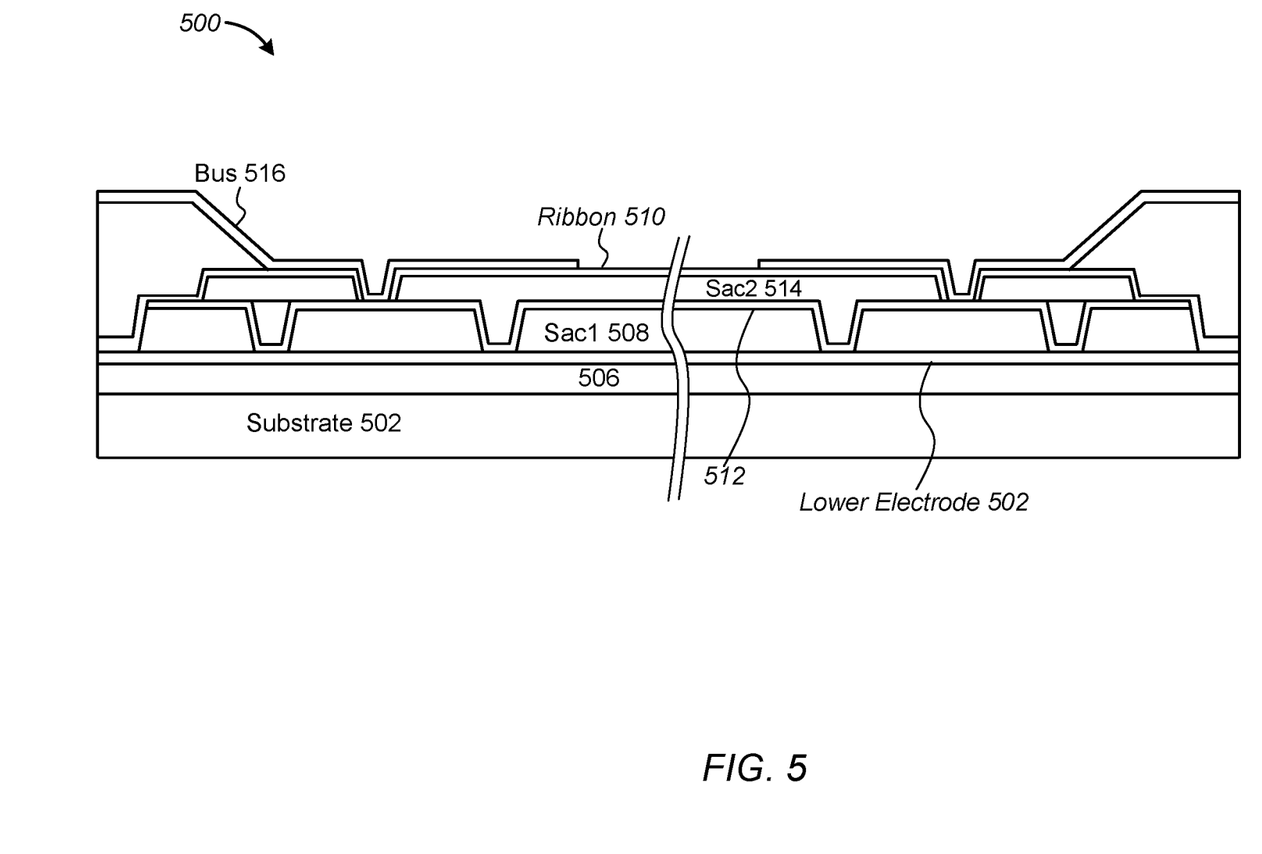
FIG. 5 is a block diagram illustrating a portion of a ribbon-type SLM during fabrication and including damping structure with an electrically permeable structure and a second air-gap under the ribbon.
Figure 6:
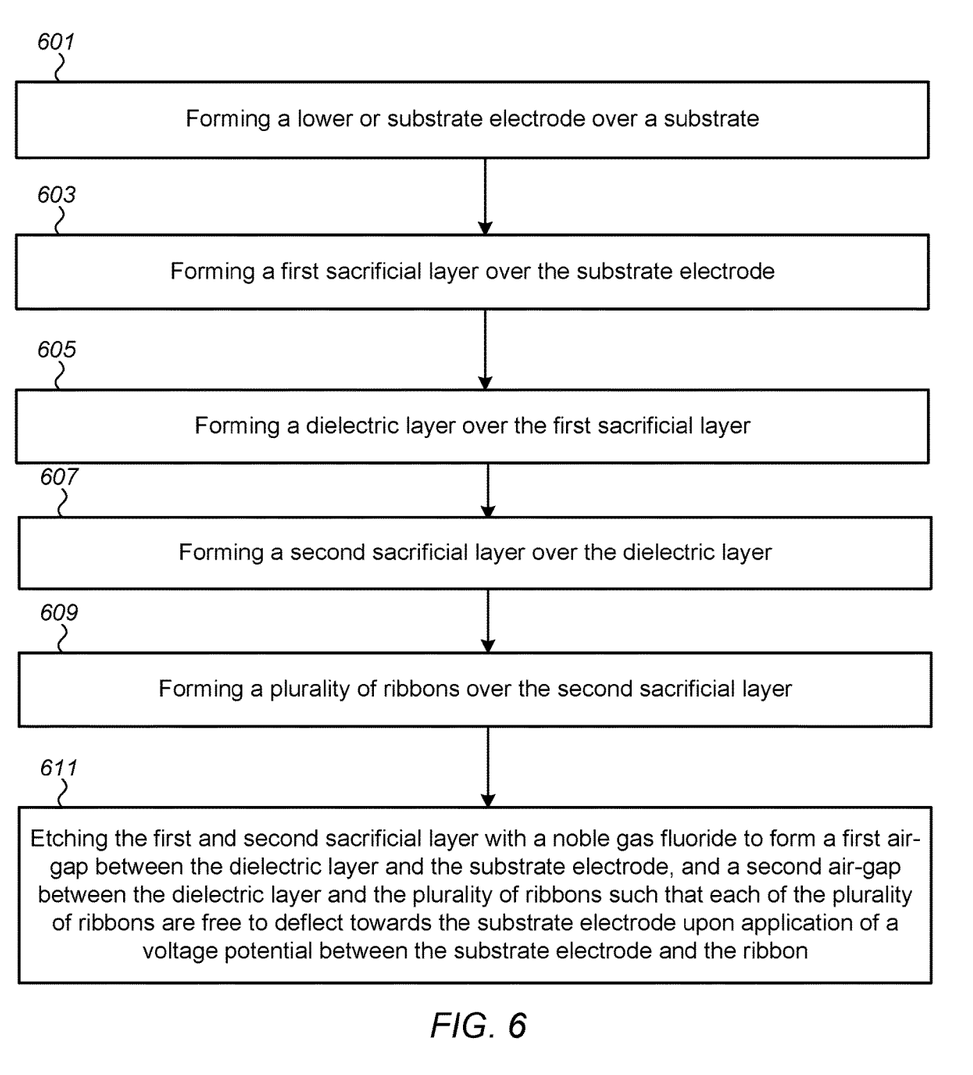
FIG. 6 is a flowchart illustrating a method of fabricating a ribbon-type including damping structure with an electrically permeable structure and a second air-gap under the ribbon.
Figure 7:
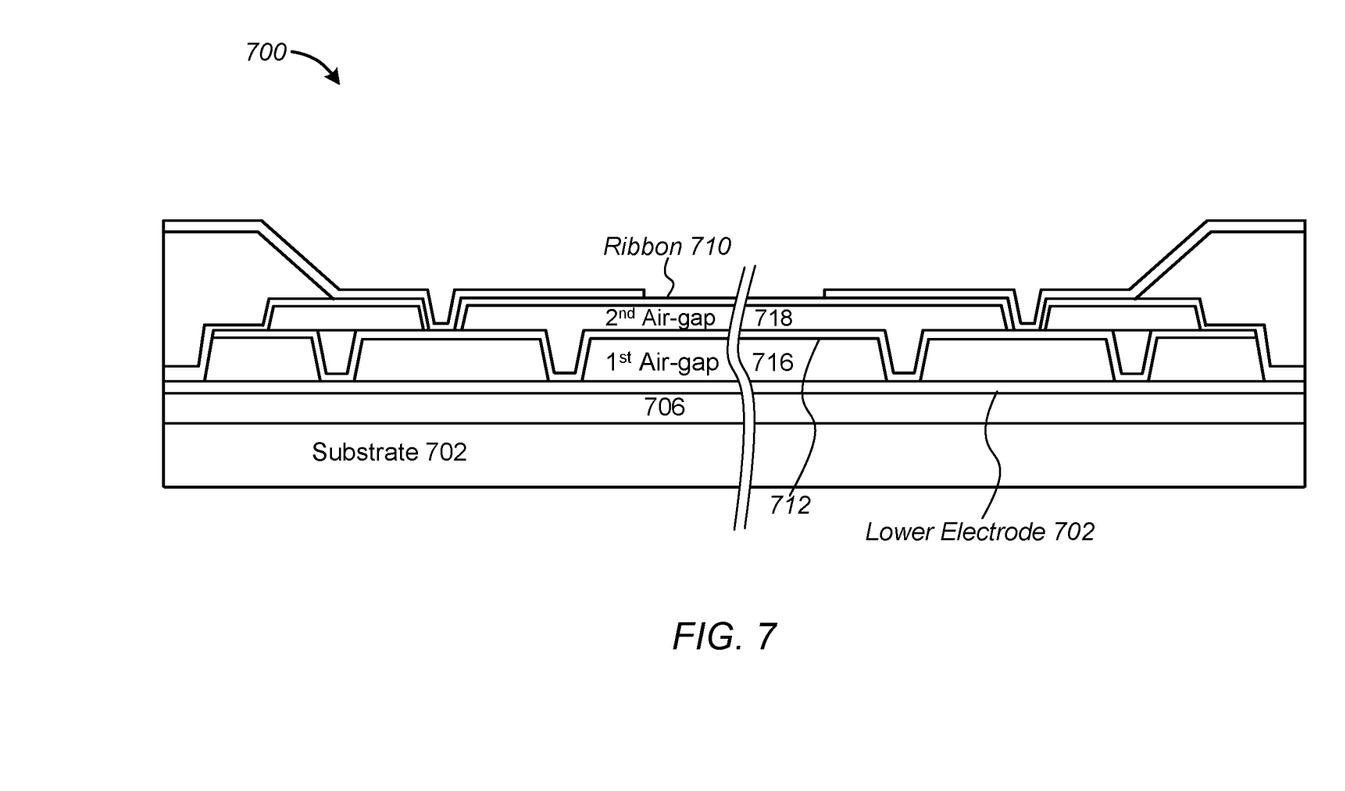
FIG. 7 is a block diagram illustrating a ribbon-type SLM with a damping structure fabricated according to the embodiments of FIGS. 5 and 6.

A ribbon-type SLM including an electrically permeable damping structure and method of forming the same will now be described with respect to FIGS. 5 through 7. FIG. 5 is a block diagram illustrating a portion of a ribbon-type SLM 500 with a damping structure including electrically permeable structure and a second air-gap under the ribbon at an intermediate point during fabrication of the ribbon-type SLM. FIG. 6 is a flowchart illustrating a method of fabricating the ribbon-type SLM with a damping structure. FIG. 7 is a block diagram illustrating a ribbon-type SLM with a damping structure fabricated according to the embodiments of FIGS. 5 and 6.

Referring to FIGS. 5 and 6, the method begins with forming a bottom or lower electrode 502 over a wafer or substrate 504 (step 601). Generally, the substrate can include any suitable semiconductor or dielectric material such as silicon, and the lower electrode can include one or more layers of any suitable conducting material such as aluminum, copper, tungsten, titanium or alloys thereof and can be deposited using any suitable CVD or PVD technique and patterned using standard photolithographic techniques and etches. Optionally, as in the embodiment shown, the method can further include depositing a thin intermediate dielectric layer 506, such as a silicon oxide over the substrate 504 prior to forming the lower electrode 502.

Next, a layer of a sacrificial material is conformably deposited over the substrate electrode 502 and patterned to form a first sacrificial layer 508 (step 603). Generally, the sacrificial material of the first sacrificial layer 508 can include any suitable material exhibiting a etch selectivity to the materials of the SLM and can be patterned using standard photolithographic techniques and etches. In one embodiment the sacrificial material of the first sacrificial layer 508 can include an amorphous silicon or polysilicon deposited by CVD to a suitable thickness. It is noted that the thickness of the first sacrificial layer 508 determines a thickness of a first air gap (not shown in this figure) of the electrically permeable damping structure. Generally, this first air gap is about ⅔ of an electrical gap between the ribbons 510 and the lower electrode 502. Furthermore, since a second air gap, which is subsequently formed between the ribbons 510 and the electrically permeable damping structure is selected to have a thickness about equal to the maximum desired stroke; the thickness of the first sacrificial layer 508 in one embodiment is about equal to twice the desired stroke. Generally the first sacrificial layer 508 has a thickness from about 0.2 μm to about 2 μm.

Next, a dielectric material is deposited and patterned to form a dielectric layer 512 of the electrically permeable damping structure over the first sacrificial layer 508 (step 605). This dielectric layer 512 can include one or more layers of dielectric material such as silicon oxide, silicon nitride or silicon oxynitride and can be deposited by CVD, atomic layer deposition (ALD) or, in the case of silicon oxides, can be thermally grown. The dielectric material is patterned using standard photolithographic techniques and etches to form openings through which the first sacrificial material is exposed for subsequent removal. Generally the thin dielectric layer 512 has a thickness from about 0.1 μm to about 0.5 μm.

Next, a conformal second sacrificial layer 514 is formed over the dielectric layer 512 (step 607).). As with the first sacrificial layer 508, the sacrificial material of the second sacrificial layer 514 can include any suitable material exhibiting a etch selectivity to the materials of the SLM and can be patterned using standard photolithographic techniques and etches. In a preferred embodiment, the sacrificial material of the second sacrificial layer 514 is the same as that of the first sacrificial layer 508 to enable it to be removed in single etch step, after the ribbons 510 are formed. Thus, in one embodiment the sacrificial material can include polysilicon deposited by CVD to a suitable thickness. As noted above, the thickness of the second sacrificial layer 514 determines the thickness of a second air gap between the ribbons 510 and the electrically permeable damping structure, and is selected to have a thickness about equal to the maximum desired stroke. Generally the second sacrificial layer 514 has a thickness from about 0.1 μm to about 1.0 μm.

Next, a plurality of ribbons 510 are formed over the second sacrificial layer 514 (step 609). Generally, this involves two to three separate depositions, beginning with deposition of a taut silicon nitride mechanical layer 120, a top or ribbon electrode layer 110, and deposition of a reflective layer 124, as shown in FIG. 1B. The taut silicon nitride mechanical layer can be deposited by CVD or ALD. The top or ribbon electrode layer can include any suitable conducting materials used for the substrate electrode and can be deposited by PVD, CVD or ALD. The reflective layer can include any suitable metal, dielectric or semiconducting material capable of providing a light reflective surface at the desired frequencies and can be deposited by PVD, CVD or ALD, depending on the material. In some embodiments, the ribbon electrode layer can include a metal that provides a light reflective surface to enable it to also serve as the reflecting layer. After deposition of the mechanical layer, a ribbon electrode layer, and reflective layer, a drive bus 516 is formed, electrically coupling each ribbon electrode to a drive channel in a driver (not shown), integrally formed on the same substrate 502 with the ribbon-type SLM 500. Next, the mechanical, electrode and reflective layers are patterned or rib-cut using standard photolithographic techniques and one or more etch steps to form the plurality of ribbons 510. It is noted that this patterning step exposes the first and second sacrificial layers 508, 514 between the ribbons 510 facilitating subsequent removal.

Finally, the first and second sacrificial layers 508, 514 are etched or removed using a noble gas fluoride, such Xenon difluoride ($XeF_2$) to form a first air-gap (first air-gap 716 in FIG. 7) between a dielectric layer 712 and a substrate electrode 702, and a second air-gap (second air-gap 718 in FIG. 7) between the dielectric layer and a plurality of ribbons 710, such that each of the plurality of ribbons are free to deflect towards the substrate electrode upon application of a voltage potential between the substrate electrode and the ribbon.

Figure 8:
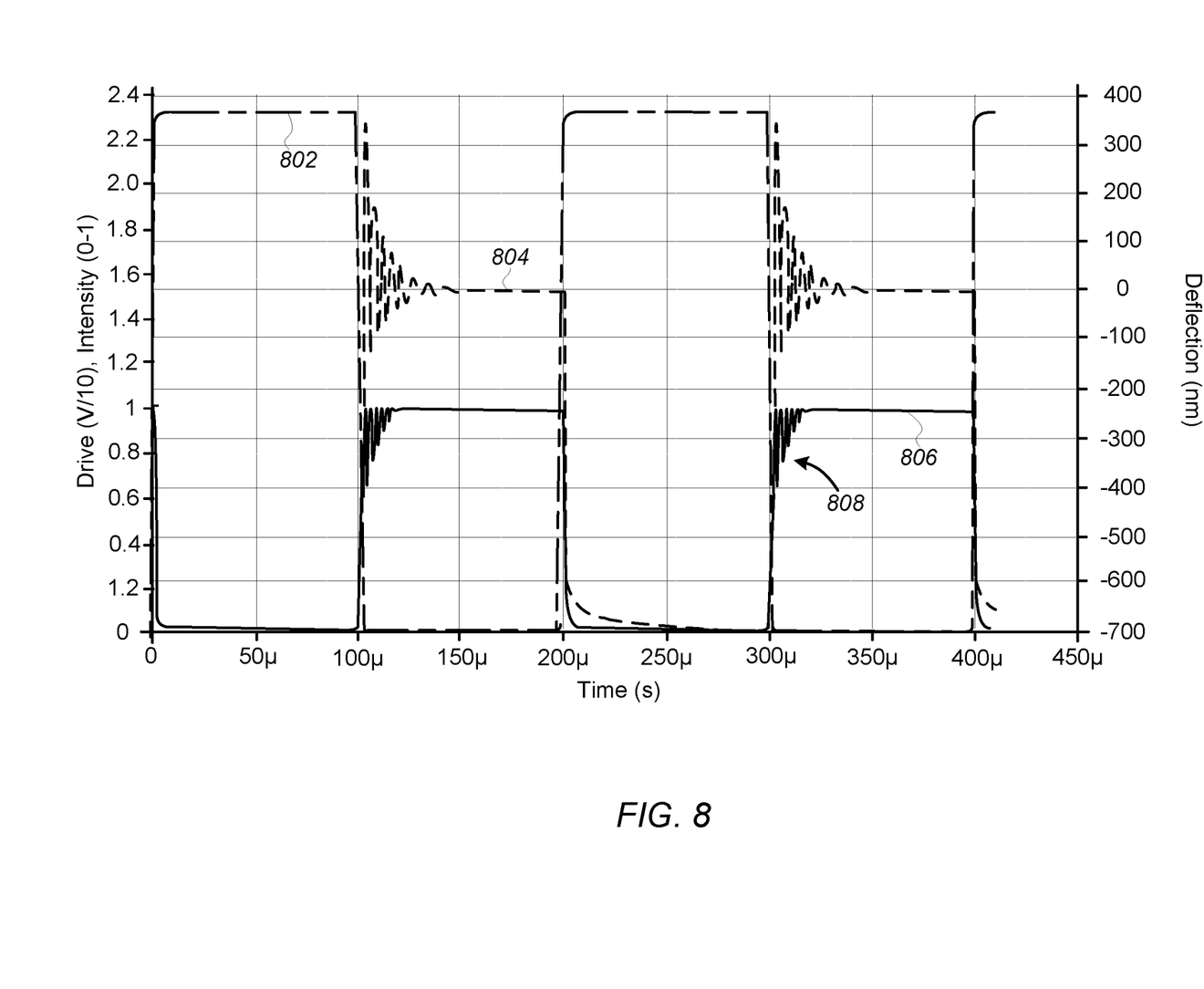
FIG. 8 illustrates a simulated response of the ribbon-type SLM of FIG. 7.

FIG. 8 illustrates a response of the ribbon-type SLM of FIG. 7 with the electrically permeable damping structure. Referring to FIG. 8, line 802 shows the drive voltage applied to ribbons having a width of 2 μm and driven between an undeflected and a deflected position at frequency of about 10 kHz. Line 804 shows the full deflection or stroke of the ribbons of about 700 nm, and line 806 shows the optical response (intensity of light reflected) of the ribbons when illuminated by light having a wavelength of 2.8 μm. It is noted that the simulation utilizes 2.8 μm incident light to enable the intensity of modulated light from the SLM to be extinguished at quarter wave deflection (2.8 μm/4 is approximately 700 nm), thereby demonstrating the optical response of the ribbon-type SLM with the electrically permeable damping structure. Referring to FIG. 8, it is noted that the optical pulses in line 806 are substantially at square with minimal ringing 808 demonstrating the efficacy of the electrically permeable damping structure in improving settling time, while maintaining a high switching speed and substantially preventing pull-in or snap-down.

Figure 9:
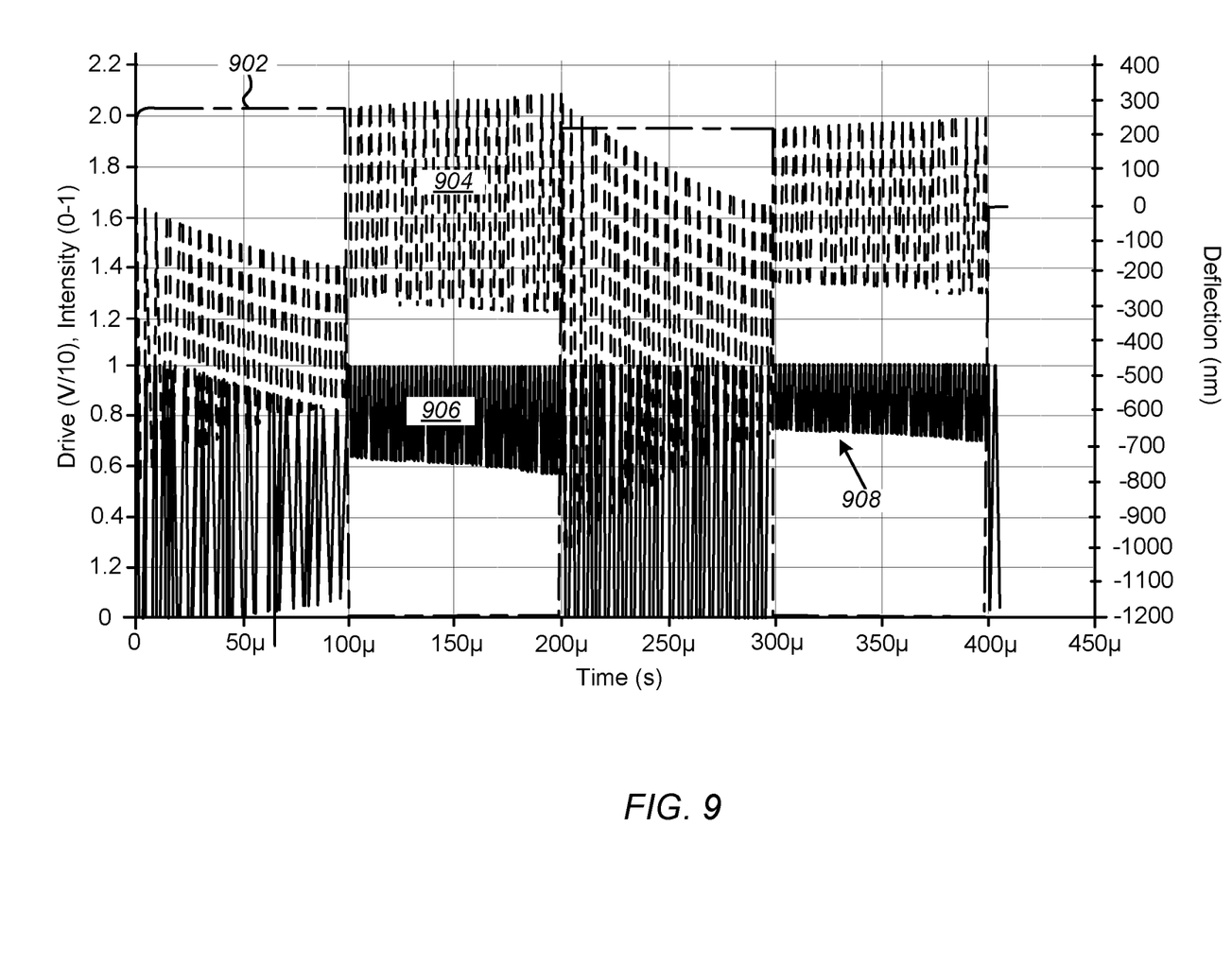
FIG. 9 illustrates a simulated response of a ribbon-type SLM without a damping structure.

In contrast, for purposes of comparison FIG. 9 illustrates a response of a ribbon-type SLM similar to that of FIGS. 5 and 7, having the same ribbon width (2 μm), but without the damping structure formed by the dielectric layer 512 and first air-gap 716, and operated at the same frequency (10 kHz) and with the same stroke as used in deriving the response shown in FIG. 8. Referring to FIG. 9, line 902 shows the drive voltage applied to ribbon, line 904 shows the deflection of the ribbons, and line 906 shows the optical response. Referring to FIG. 9, it is noted that that the ribbon oscillation is heavy, resulting in substantial amounts of ringing 908, rendering the SLM unusable at drive frequencies or frame rates of 10 kHz.

Figure 10:
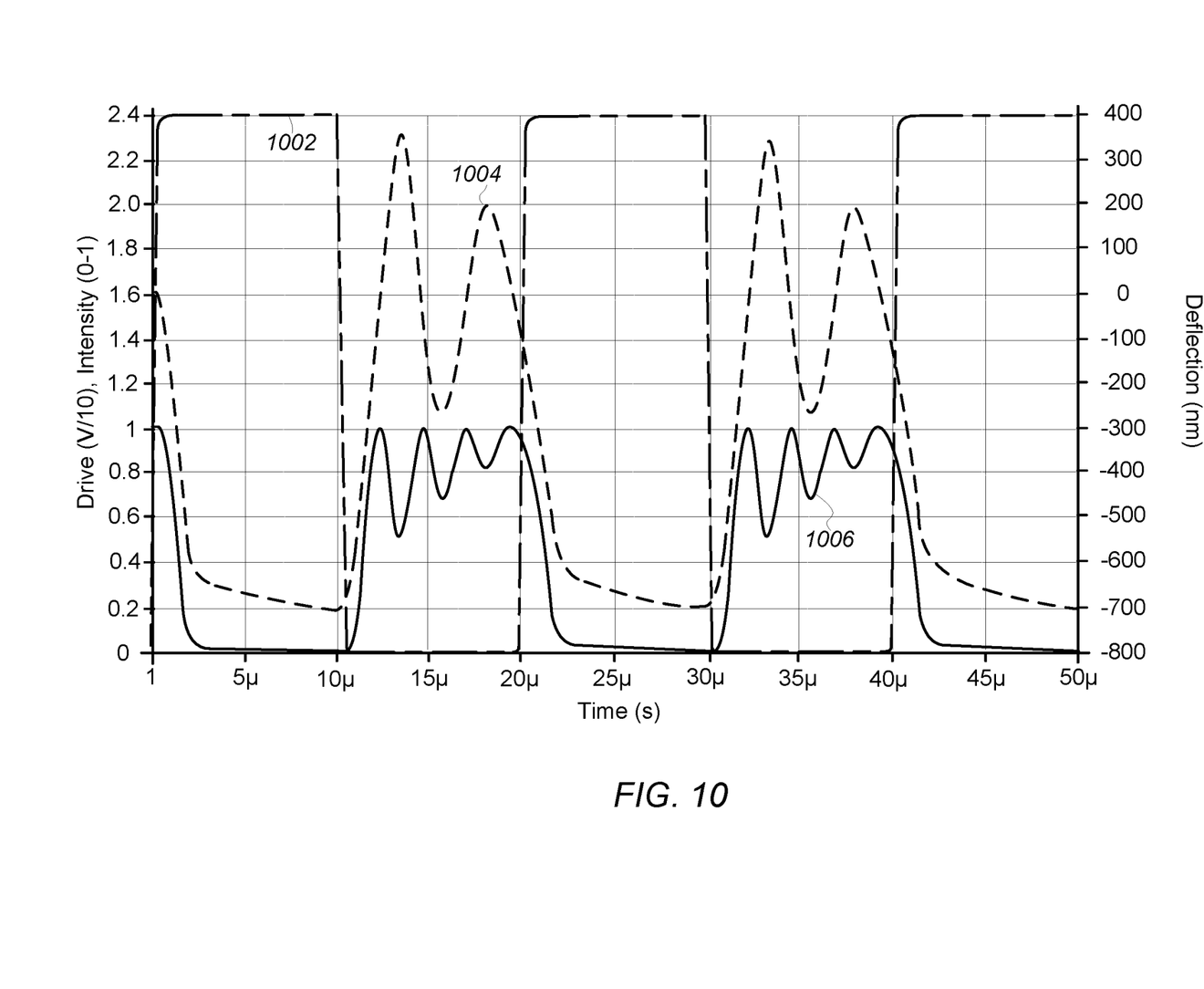
FIG. 10 illustrates a simulated improved dynamic response of the ribbon-type SLM of FIG. 7 with the damping structure at 100 KHz.

FIG. 10 illustrates a simulated improved dynamic response of the ribbon-type SLM of FIG. 7 with the electrically permeable damping structure operated at a frequency or frame rate greater than 100 KHz. Referring to FIG. 10, line 1002 shows the drive voltage applied to ribbons having a width of 2 μm and driven between an undeflected and a deflected position at frequency of about 100 kHz. Line 1004 shows the deflection or stroke of the ribbons, and line 1006 shows the optical response. Referring to FIG. 10, it is noted that the optical pulses in line 1006 are still substantially square, clearly superior to the response of the undamped ribbons shown in FIG. 9, even when driven at a frequency 10 times greater than the conventional SLM of FIG. 9, thus demonstrating the efficacy of the electrically permeable damping structure in improving settling time, while maintaining a high switching speed and substantially preventing pull-in or snap-down.

In another aspect, an efficient method for driving the capacitive MEMS device is provided. Generally, the method involves ganging together a large group of MEMS pixels, each including a plurality of electrostatically deflectable narrow ribbons, and driving each group of MEMS pixels with a repetitive pattern to steer a beam of light reflected from the ribbons. An embodiment of this method for driving a MEMS-based phased-array will now be described with reference to FIGS. 11A and 11B, and FIG. 12.

Figure 11A:
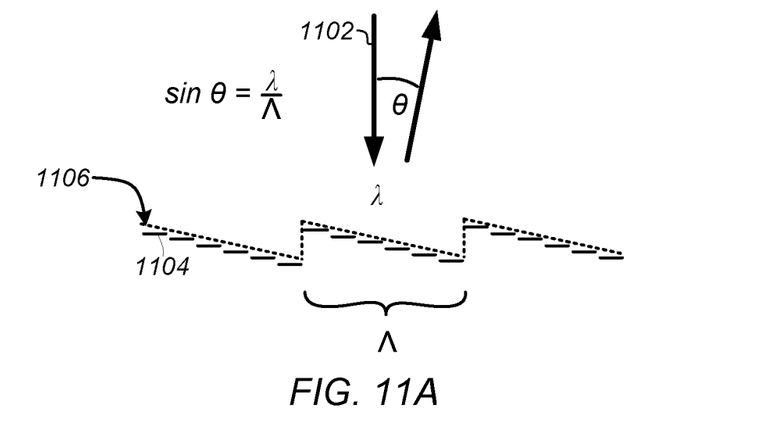
FIGS. 11A and 11B illustrates how increasing the period of pixels in a ribbon-type SLM used in phased-array beam scanning increases angular steering.
Figure 11B:
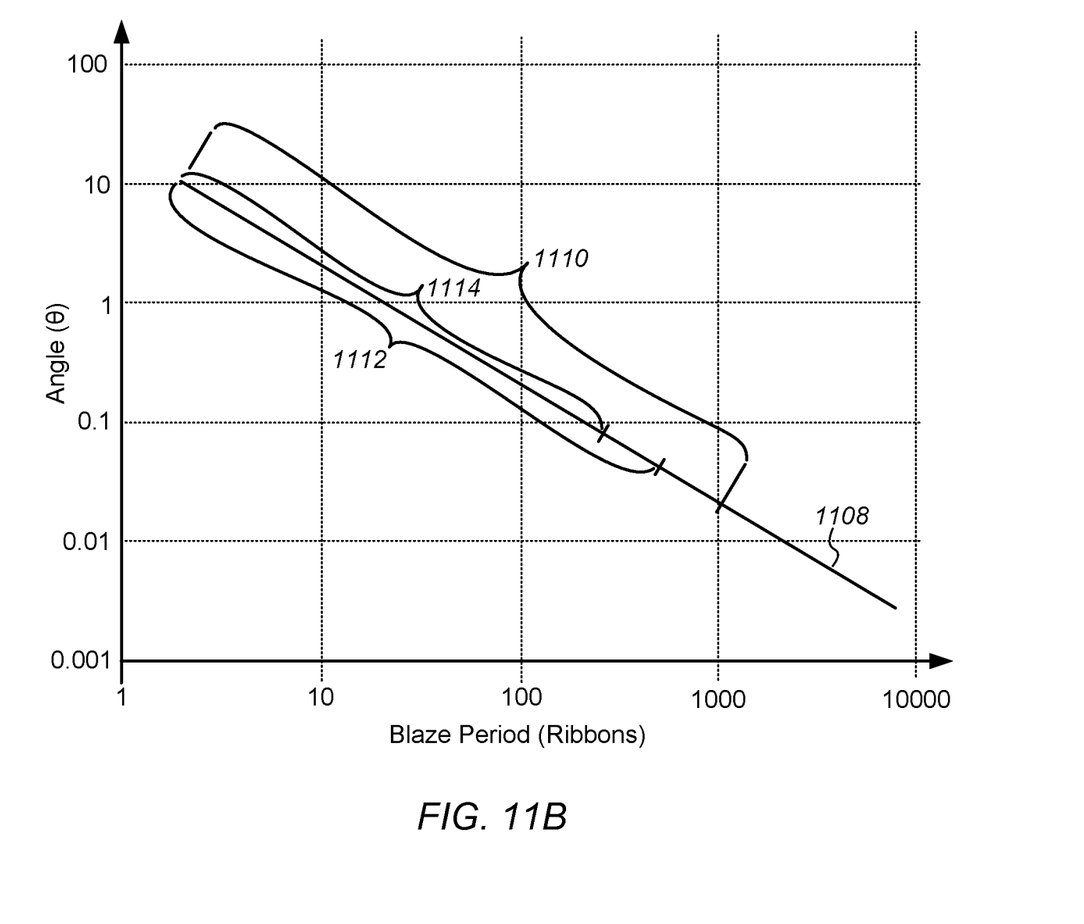

FIGS. 11A and 11B illustrate how increasing the period of pixels in a ribbon-type SLM used in phased-array beam scanning increases angular steering. Referring to FIG. 11A, in order to steer a beam 1102, ribbons 1104 are arranged in a "blaze" pattern 1106 of pitch or period Λ to reflect light incident on the ribbons at an normal angle of incidence at an angle θ. Generally, the blaze period is dependent on the number of ribbons in a MEMS pixel, where each pixel repeats the blaze pattern. By regularly and continuously changing the pitch of the blaze pattern 1106, angular sweep of the reflected light is achieved.

The angle by which the light is reflected from the ribbon-type SLM in a blazed configuration is related to the period Λ and to a wavelength (λ) of the incident light is given by:

$$\sin \theta = \Lambda$$

Thus, it is noted that a steering angle θ, or angle by which incident light is reflected is strong inversely related to blaze pitch (Λ), while long period gratings add angular resolution where resolution is already good (i.e. around mirror surface normal). FIG. 11B illustrates the angular swing for a various blaze periods for light at a wavelength (λ) of about 980 nm. Referring to FIG. 11B, line 1108 represents the angular swing that can be achieved by a ribbon-type SLM having a blaze period of 8192 ribbons, each having a width of 2.5 nm. The portion of line 1108 indicated by reference numeral 1110 represents the angular swing that can be achieved by a blaze period of 1024 ribbons. The portion of line 1108 indicated by reference numeral 1112 represents the angular swing that can be achieved by a blaze period of 512 ribbons. The portion of line 1108 indicated by reference numeral 1114 represents the angular swing that can be achieved by a blaze period of 256 ribbons. It is observed from FIG. 11B that most of angular swing is achieved with short blaze periods. For example, 100 ribbons achieves 0.1° minimum angle.

The physical length of the array is also important in many phased-array applications. It has been found that longer arrays, with a greater number of ribbons, provide better angular resolution. However, as noted above, ribbon width is typically minimized in order to maximize angular range. Thus, for a phased-array device it is desirable to provide a ribbon-type SLM having a large number of ribbons, and with shorter blaze periods.

Conventional and prior art ribbon-type SLM used in diffract imaging typically include smaller arrays with a lower number of ribbons, and as a result typically assign a single CMOS driver or drive channel to each to each ribbon. While this approach is conceptually straightforward, it is unnecessary and inefficient for ribbon-type SLM used for beam steering in which the same highly periodic blaze pattern repeated many times along the array. Moreover, long period blaze patterns are not necessary because they only increase resolution near normal (zero-degrees), providing more resolution where angular resolution is already good. Thus, dedicated drivers for each ribbon are inefficient, resulting in excessive data rate, power consumption, size and cost.

Figure 12:
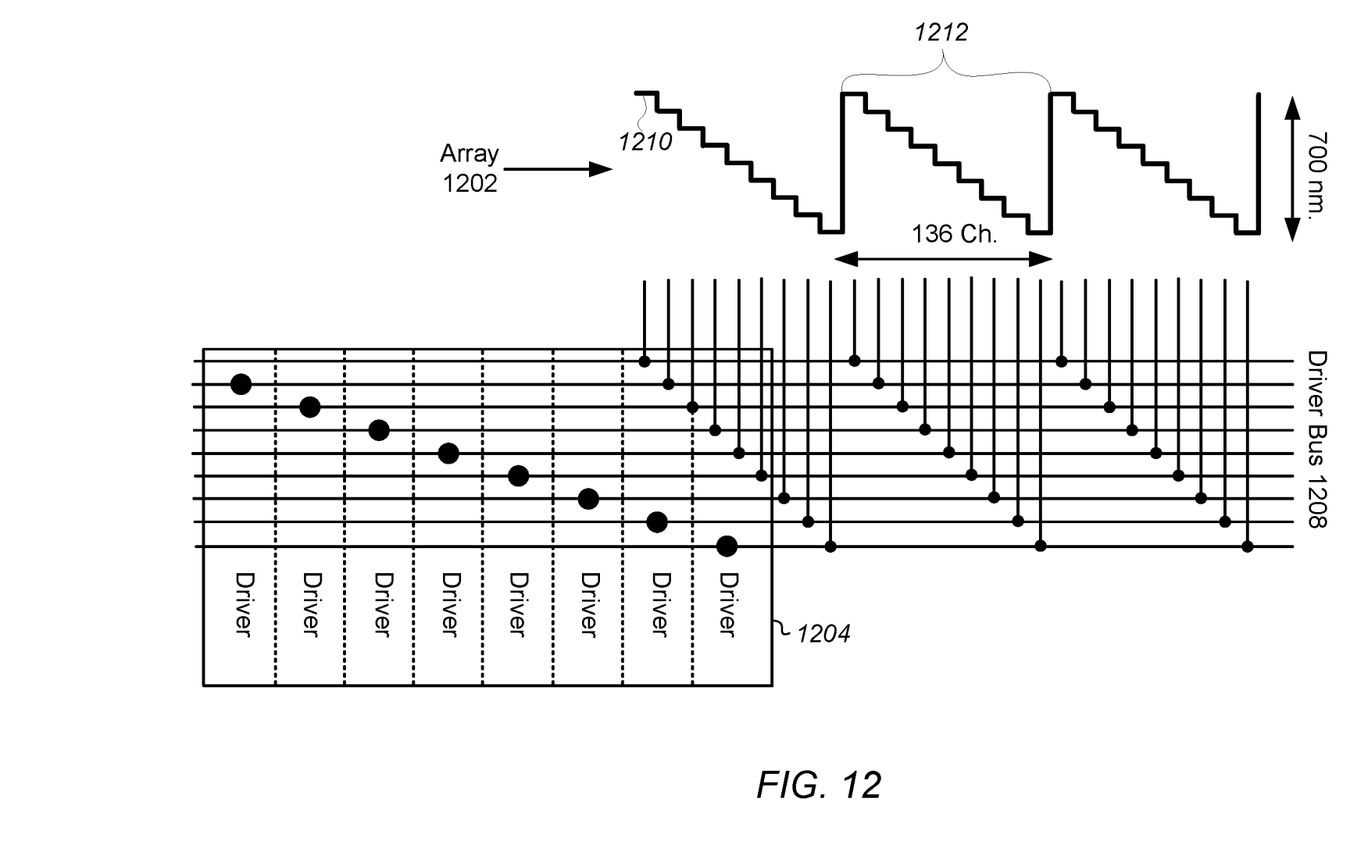
FIG. 12 is a schematic block diagram illustrating architecture of a ribbon array, drivers and driver bus of a ribbon-type SLM.

A better approach is to gang larger groups of ribbons with blazed grating to a much smaller number of electronic drivers. One embodiment of this approach is shown in FIG. 12. FIG. 12 is a schematic block diagram of a ribbon-type SLM illustrating a portion of the ribbon array 1202, a number of drivers or drive channels 1204 and driver bus 1208. Referring to FIG. 12, it is seen that each of the drive channels 1204 are interlaced and interconnected to multiple ribbons 1210 in the array 1202, such that each drive channel is coupled through the driver bus 1208 to only one ribbon 1210 in each one of multiple pixels 1212 in the array. It is noted that in the embodiment shown in FIG. 12 for illustrative purpose the number of drive channels 1204 and ribbons 1210 are limited to eight. However, it will be understood that in actual implementation the number of drive channels 1204, pixels 1212, and ribbons in the array 1202 can be any number desired for the application in which the ribbon-type SLM is to be used. For example, in one embodiment particularly suitable for use in LIDAR, the array 1202 can include hundreds of pixels 1212, each including 136 ribbons 1210 driven through a driver bus with 136 conductors by 136 drive channels. In this embodiment, the longest blaze period is equal to the number of channel drivers. Shorter blaze periods can be achieved by programming drivers with repetitive patterns. This design economizes on data rate, power consumption, module size and cost, while preserving good light gathering aperture and high angular resolution. The implementation of this design requires good device uniformity (i.e. no individual pixel calibration).

Thus, embodiments of a spatial light modulator (SLM), including, and methods for operating the same for efficient data transmission have been described. Although the present disclosure has been described with reference to specific exemplary embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of one or more embodiments of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

Reference in the description to one embodiment or an embodiment means that a particular feature, structure, or characteristic described in connection with the embodiment is included in at least one embodiment of the circuit or method. The appearances of the phrase one embodiment in various places in the specification do not necessarily all refer to the same embodiment.

What is claimed is:

1. A micro electro-mechanical systems (MEMS) device comprising:
    a bottom electrode formed over a substrate;
    an electrically permeable damping structure including a damper, formed over the bottom electrode, the electrically permeable damping structure including a first air-gap and a dielectric layer suspended above and separated from the bottom electrode by the first air-gap; and
    a plurality of movable members suspended above the damping structure and separated therefrom by a second air-gap, each of the plurality of movable members including a top electrode and being configured to deflect towards the bottom electrode by electrostatic force.

2. The MEMS device of claim 1 wherein the plurality of movable members comprise a plurality of independently deflectable ribbons, each of ribbon comprising a reflective surface to modulate light incident on the MEMS device.

3. The MEMS device of claim 2 wherein the plurality of independently deflectable ribbons are configured to deflect towards the bottom electrode by a distance substantially equal to a thickness of the second air-gap.

4. The MEMS device of claim 3 wherein the thickness of the second air-gap is up to 2 μm.

5. The MEMS device of claim 2 wherein the dielectric layer substantially surrounds and overlies the first air-gap.

6. The MEMS device of claim 2 wherein each of the plurality of independently deflectable ribbons comprise width of from 2.5 μm to 0.5 μm.

7. The MEMS device of claim 1 wherein the dielectric layer is separated from the bottom electrode by a distance of 2G/3, where G is a distance between the bottom electrode and the plurality of movable members when undeflected.

8. The MEMS device of claim 7 wherein an undeflected movable member is separated from the dielectric layer of the electrically permeable damping structure by a distance of G/3.

* * * * *